(12) United States Patent
Fliearman

(10) Patent No.: US 10,106,010 B2
(45) Date of Patent: Oct. 23, 2018

(54) MODULAR TORQUE COMPENSATED WALKING BEAM ASSEMBLY FOR WORK VEHICLE

(71) Applicant: Deere & Company, Moline, IL (US)

(72) Inventor: Steven R. Fliearman, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 154 days.

(21) Appl. No.: 15/255,860

(22) Filed: Sep. 2, 2016

(65) Prior Publication Data
US 2018/0065440 A1  Mar. 8, 2018

(51) Int. Cl.
| | | |
|---|---|---|
| B60G 21/00 | (2006.01) | |
| B60K 17/04 | (2006.01) | |
| B60K 17/36 | (2006.01) | |
| E02F 9/02 | (2006.01) | |
| B60G 21/10 | (2006.01) | |
| F16H 57/04 | (2010.01) | |
| F16H 37/06 | (2006.01) | |

(52) U.S. Cl.
CPC .......... B60G 21/002 (2013.01); B60K 17/046 (2013.01); B60K 17/36 (2013.01); E02F 9/02 (2013.01); *B60G 21/103* (2013.01); *B60G 2200/318* (2013.01); *F16H 37/065* (2013.01); *F16H 57/0482* (2013.01)

(58) Field of Classification Search
CPC .... B60K 17/046; B60K 17/043; B60K 17/36; E02F 9/02; B60G 2200/318
See application file for complete search history.

(56) References Cited

U.S. PATENT DOCUMENTS

| | | |
|---|---|---|
| 2,819,910 A | 1/1958 | Walter |
| 3,166,142 A | 1/1965 | Frazier |
| 3,450,221 A * | 6/1969 | Nelson ............... B60G 5/02 |
| | | 180/24.02 |
| 3,786,888 A | 1/1974 | Nelson |
| 3,792,871 A | 2/1974 | Chalmers |
| 4,535,860 A | 8/1985 | Waggoner |

(Continued)

OTHER PUBLICATIONS

European Patent Office, Extended European Search Report for Application No. 17184539.9-1012 dated Jan. 10, 2018.

*Primary Examiner* — Faye M Fleming
(74) *Attorney, Agent, or Firm* — Klintworth & Rozenblat IP LLP; Steven J. Wietrzny

(57) ABSTRACT

A walking beam assembly includes a support beam and a mount member configured to mount the support beam on a vehicle chassis. Furthermore, the assembly includes a gear assembly that is supported proximate an end of the support beam. The gear assembly includes a gear train and a gear housing. The gear train is operably coupled to a wheel hub. The gear housing substantially encloses the gear train. Moreover, the walking beam assembly includes an input drive assembly with at least one movable part configured to deliver an input torque from the vehicle engine to the gear train. The input drive assembly includes an input drive housing that substantially encloses the at least one movable part. The input drive housing is attached to the gear housing such that an interior of the input drive housing is in fluid communication an interior of the gear housing.

20 Claims, 8 Drawing Sheets

(56) References Cited

U.S. PATENT DOCUMENTS

| | | | |
|---|---|---|---|
| 5,016,905 A | 5/1991 | Licari | |
| 5,417,297 A | 5/1995 | Auer | |
| 7,229,094 B2 | 6/2007 | Miller et al. | |
| 7,296,642 B1 | 11/2007 | Dewald | |
| 7,832,509 B2 | 11/2010 | Thomson et al. | |
| 7,954,574 B2* | 6/2011 | Schoon | B60K 1/02 180/6.48 |
| 8,262,125 B2 | 9/2012 | Sergison et al. | |
| 9,242,556 B2* | 1/2016 | Ziech | B60K 17/36 |
| 9,358,880 B2* | 6/2016 | Bindl | F16H 48/10 |
| 2005/0045390 A1 | 3/2005 | Lamela et al. | |
| 2018/0065439 A1* | 3/2018 | Fliearman | B60K 17/36 |

* cited by examiner

MODULAR TORQUE COMPENSATED WALKING BEAM ASSEMBLY FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and, more particularly, relates to a modular walking beam assembly for work vehicles.

BACKGROUND OF THE DISCLOSURE

Work vehicles, particularly those work vehicles configured for carrying heavy loads, may include a tandem axle wheel arrangement with a plurality of power driven wheels. In some cases, two or more wheels are disposed on the same side of the vehicle and torque is delivered to each wheel.

In some cases, a walking beam assembly (i.e., a Bogie suspension) is included for attaching these wheels to the vehicle chassis. The walking beam assembly may be used to transfer and distribute forces between the wheels as the work vehicle travels. The walking beam assembly may also distribute downforce substantially evenly across the multiple wheels.

SUMMARY OF THE DISCLOSURE

This disclosure provides a modular torque compensated walking beam assembly for a work vehicle.

In one aspect the disclosure provides a torque compensated walking beam assembly for a vehicle with an engine, a chassis, and a wheel. The walking beam assembly includes a support beam having an end. The walking beam assembly also includes a mount member that is configured to mount the support beam on the chassis such that the support beam is able to rotate relative to the chassis. Furthermore, the walking beam assembly includes a gear assembly that is supported proximate the end of the support beam. The gear assembly includes a gear train and a gear housing. The gear train is operably coupled to a wheel hub. The wheel hub is configured to support the wheel. The gear housing substantially encloses the gear train. Moreover, the walking beam assembly includes an input drive assembly with at least one movable part configured to deliver an input torque from the engine to the gear train. The input drive assembly includes an input drive housing that substantially encloses the at least one movable part. The input drive housing is attached to the gear housing. One of the gear housing and the input drive housing includes an intermediate member that substantially closes off the one of the gear housing and the input drive housing. The other of the gear housing and the input drive housing is attached to the intermediate member. The intermediate member includes an opening that provides fluid communication between an interior of the input drive housing and an interior of the gear housing.

In another aspect, the disclosure provides a method of assembling a torque compensated walking beam assembly for a vehicle. The method includes providing a support beam with a mount member and a gear assembly that is supported on an end of the support beam. The mount member is configured to rotationally attach the support beam on a chassis of the vehicle. The gear train is operably coupled to a wheel hub. The gear housing substantially encloses the gear train. The method also includes providing an input drive assembly that includes at least one movable part and an input drive housing that substantially encloses the at least one movable part. Furthermore, the method includes attaching an intermediate member of one of the gear housing and the input drive housing to the other of the gear housing and the input drive housing such that the intermediate member is disposed between the gear train and the at least one movable part of the input drive assembly. The intermediate member includes an opening. Moreover, the method includes attaching the at least one movable part of the input drive assembly to the gear train such that the input drive assembly is configured to deliver an input torque from an engine of the vehicle to the gear train. Additionally, the method includes attaching the input drive housing of the input drive assembly to the gear housing such that the opening provides fluid communication between an interior of the input drive housing and an interior of the gear housing.

In an additional aspect, the disclosure provides a modular torque compensated walking beam assembly for a work vehicle having an engine, a chassis, and a wheel. The walking beam assembly includes a first module that includes a support beam that includes an end, a mount member that is configured to mount the support beam on the chassis such that the support beam is able to rotate relative to the chassis, and a gear assembly that is supported proximate the end of the support beam. The gear assembly includes a gear train and a gear housing. The gear train is operably coupled to a wheel hub. The wheel hub is configured to support the wheel. The gear housing substantially encloses the gear train. Additionally, the walking beam assembly includes a second module that is attached to the first module. The second module includes an input drive assembly with at least one movable part configured to deliver an input torque from the engine to the gear train. The input drive assembly includes an input drive housing that substantially encloses the at least one movable part. The input drive housing is attached to the gear housing. One of the gear housing and the input drive housing includes an intermediate member that substantially closes off the one of the gear housing and the input drive housing. The other of the gear housing and the input drive housing is attached to the intermediate member. The intermediate member includes an opening that provides fluid communication between an interior of the input drive housing and an interior of the gear housing.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
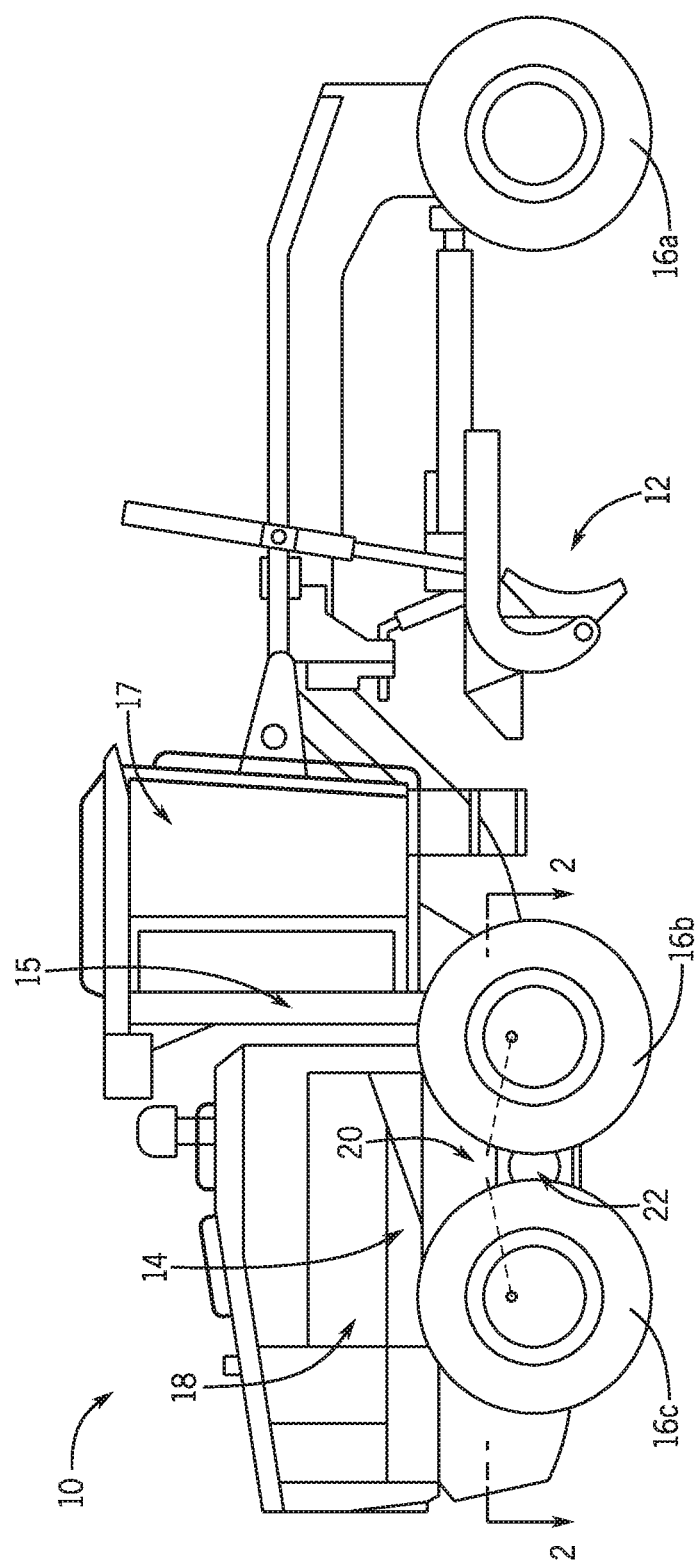
FIG. 1 is a side view of a work vehicle in the form of a motor grader with a modular walking beam assembly according to example embodiments of the present disclosure.

The following describes one or more example embodiments of modular walking beam assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed modular walking beam assembly as shown in the accompanying figures. In one example application, the disclosed walking beam assembly is configured to provide improved downforce distribution to a set of tandem wheels during operation of a work vehicle, especially during acceleration and deceleration of the work vehicle in which the disclosed arrangement may respond to input torque changes with reactive forces or moments to maintain both wheels into engagement with the ground. The disclosed modular walking beam assembly as well as its methods of manufacture provide a number of benefits as compared to conventional walking beam assemblies.

In some embodiments, the modular walking beam assembly may include a plurality of separate modules or subcomponents. The modules may be assembled together to collectively define the walking beam assembly. When assembled, the walking beam assembly attaches plural wheels of the work vehicle to the chassis (i.e., the vehicle frame) of the vehicle. Additionally, the walking beam assembly transfers and distributes torque from the vehicle engine to the wheels. The walking beam assembly also provides stability and substantially equal torque distribution between the wheels. Moreover, the walking beam assembly is configured to counteract forces that cause the walking beam to rotate as a unit relative to the chassis of the vehicle.

Because the walking beam assembly is assembled from a plurality of separate modules/subcomponents, the walking beam assembly provides various advantages over conventional walking beams. For example, the walking beam assembly may be more compact and/or lightweight than conventional walking beam assemblies, and yet, the walking beam assembly may be more robust and durable than conventional walking beam assemblies.

Also, the modular walking beam assembly of the present disclosure may provide manufacturing efficiencies. For example, the modules may be manufactured independently while other modules are being simultaneously manufactured, and then the modules may be subsequently assembled together. Accordingly, the walking beam assembly may be manufactured with a high level of throughput.

Additionally, the modular walking beam assembly of the present disclosure may be positioned in a variety of alternative configurations. The configuration may be chosen based on particular needs of the user, based on the work to be performed by the work vehicle, or according to other considerations. Accordingly, the modular walking beam assembly may have a high degree of variability, versatility, and usefulness.

FIG. 1 illustrates an example embodiment of a work vehicle, which may include a modular walking beam assembly according to this disclosure. Various features of the disclosed modular walking beam assembly will be discussed according to example embodiments.

The work vehicle 10 may be of various types, such as a motor grader. However, it will be appreciated that the work vehicle 10 may be another type without departing from the scope of the present disclosure (e.g., a truck, a dozer, other vehicles used in the construction, agriculture, or forestry industries, etc.).

As shown in FIG. 1, the work vehicle 10 may include a chassis 14 (i.e., a vehicle frame) and a body 15. The chassis 14 supports the body 15. The body 15 may include an operator compartment 17. The work vehicle 10 may also include an implement 12, such as a grader blade, bucket, shovel, etc., which is supported by the chassis 14. The work vehicle 10 may also include a plurality of wheels 16a, 16b, 16c, and a suspension 20 that connects at least some of the wheels 16a, 16b, 16c to the chassis 14. The suspension 20 may support the chassis 14 upon the wheels 16a, 16b, 16c. FIG. 1 shows one side of the vehicle 10 and shows a front wheel 16a and two rear wheels 16b, 16c. The opposite side of the work vehicle 10 may include corresponding wheels as well. It will be appreciated that the configuration of the wheels 16a, 16b, 16c shown in FIG. 1 is merely an example and that work vehicle 10 may include another configuration (e.g., a different number of wheels or wheels in different positions) without departing from the scope of the present disclosure.

The vehicle 10 may also include a power source, such as an engine 18. The engine 18 may be an internal combustion engine, such as a diesel engine, in some embodiments. The engine 18 may operate to generate torque and power, which is ultimately delivered to at least one of the wheels 16a, 16b, 16c. In additional embodiments, the vehicle 10 may include an electric motor or other type of power source.

Additionally, the suspension 20 may include at least one walking beam assembly 22 (i.e., a working beam or Bogie suspension). The walking beam assembly 22 may be mounted to the chassis 14. Also, at least two of the wheels (e.g. the rear wheels 16b, 16c) may be mounted on the walking beam assembly 22. The wheels 16b, 16c may be considered tandem wheels supported on tandem axles. The walking beam assembly 22 may connect the wheels 16b, 16c to the chassis 14. The walking beam assembly 22 may also include features that deliver torque and power from the engine 18 to the wheels 16b, 16c. Additionally, in some embodiments, the walking beam assembly 22 may include at least one gear train (i.e., final drive) that increases torque delivered to the wheels 16b, 16c. Furthermore, the walking beam assembly 22 may distribute substantially balanced down force (i.e., force directed toward the ground) to the wheels 16b, 16c. Moreover, the walking beam assembly 22 may counteract forces that tend to lift one of the wheels 16b, 16c off of the ground while counteracting forces that tend to drive the other wheel 16b, 16c toward the ground.

Figure 2:
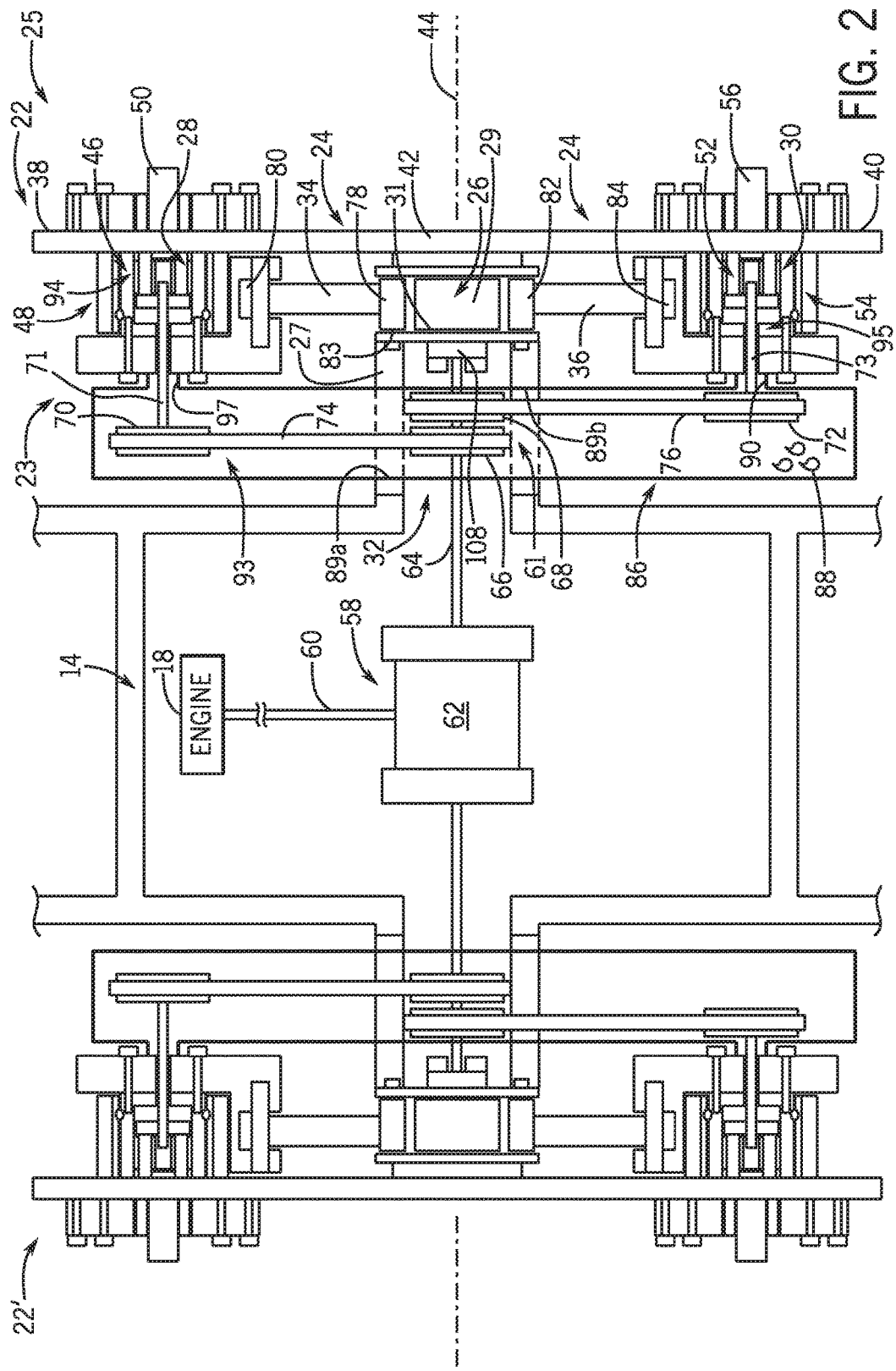
FIG. 2 is a schematic top view of the modular walking beam assembly and portions of the chassis of the work vehicle, taken from the perspective of the line 2-2 of FIG. 1.

FIG. 2 schematically illustrates portions of the vehicle 10 in a top view. The walking beam assembly 22 shown in FIG. 1 is represented in FIG. 2 as well as a similar walking beam assembly 22' for the opposite side of the vehicle 10. The walking beam assembly 22' may be substantially similar to the walking beam assembly 22. Thus, for purposes of brevity, only the walking beam assembly 22 will be described in detail.

The walking beam assembly 22 may be a modular walking beam assembly 22. In other words, the walking beam assembly 22 may include a plurality of independent modules. These modules may be assembled together to define the walking beam assembly 22.

Figure 3:
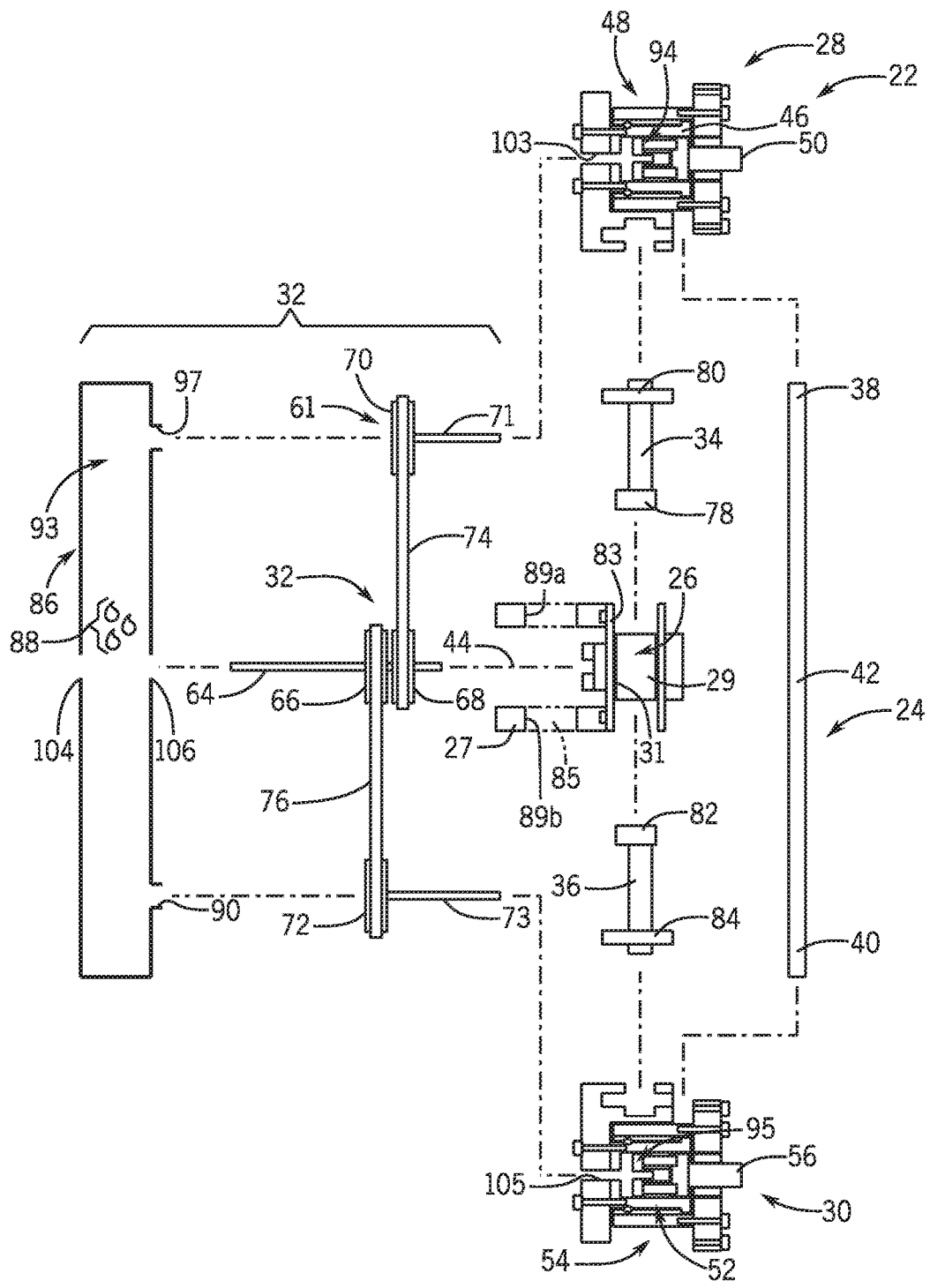
FIG. 3 is an exploded schematic view of the modular walking beam assembly of FIG. 2.

The modules of the walking beam assembly 22 are shown in an exploded view in FIG. 3 according to example embodiments of the present disclosure. As shown, the walking beam assembly 22 may include a support beam 24, a mount member 26, a first gear assembly 28 (i.e., a first final drive assembly), a second gear assembly 30 (i.e., a second final drive assembly), an input drive assembly 32, a first reaction member 34, and a second reaction member 36.

The support beam 24 may be an elongate member that is strong and rigid for load-bearing purposes. In some embodiments, the support beam 24 may be made out of steel or other material with high strength and rigidity. The support beam 24 may include a first end 38 and an opposite second end 40. The first end 38 may be referred to as a front end and the second end 40 may be referred to as a rear end. The support beam 24 may also include a middle portion 42, which is disposed between the first and second ends 38, 40.

The mount member 26 may, in some embodiments, include a chassis attachment portion 27 and a beam attachment portion 29. The beam attachment portion 29 may be rotationally attached to the chassis attachment portion 27 via a rotational bearing 31 for relative rotation about an axis of rotation 44. The rotational bearing 31 may be a journal bearing, a roller element bearing (e.g., a bearing with ball bearings or rollers), or another type. As shown in FIG. 3, the chassis attachment portion 27 may include an end member 83 and a hollow member 85. The end member 83 may be attached to the rotational bearing 31, and the hollow member 85 may extend from the end member 83. The hollow member 85 may be hollow and cylindrical in some embodiments. The hollow member 85 of the chassis attachment portion 27 may be fixed to the chassis 14 as shown in FIG. 2. The beam attachment portion 29 may be fixedly attached to the support beam 24. Accordingly, the beam attachment portion 29 and the support beam 24 may be supported for rotation as a unit about an axis 44 relative to the chassis attachment portion 27 and the chassis 14.

The first gear assembly 28 may include a first gear train 46. The first gear train 46 may include a plurality of intermeshed gears. In some embodiments, the first gear train 46 may be a planetary gear set. However, other configurations of the first gear train 46 may be incorporated without departing from the scope of the present disclosure. The first gear assembly 28 may additionally include a first gear housing 48, which at least partially encloses the first gear train 46. In some embodiments, the first gear assembly 28 may include an opening 103 on one side. The first gear housing 48 may support the gears of the first gear train 46 for rotation therein. The first gear housing 48 may be fixedly attached to the support beam 24, proximate the first end 38. Additionally, a first wheel hub 50 may be attached to the first gear train 46 and may extend out from the first gear housing 48. The wheel 16b (FIG. 1) may be attached to the first wheel hub 50.

The second gear assembly 30 may be substantially similar to the first gear assembly 28. Accordingly, the second gear assembly 30 may include a second gear train 52, a second gear housing 54, and a second wheel hub 56. The second gear housing 54 may include an opening 105. Also, the second gear housing 54 may be fixedly attached to the support beam 24, proximate the second end 40. The wheel 16c (FIG. 1) may be attached to the second wheel hub 56.

The first reaction member 34 may be an elongate and rigid member, such as a bar. The second reaction member 36 may be substantially similar. The first reaction member 34 may include a first end 78 that is pivotally coupled to the chassis attachment portion 27 of the mount member 26. Also, the reaction member 34 may include a second end 80 that is pivotally coupled to the first gear assembly 28 as will be discussed in detail below. Likewise, the second reaction member 36 may include a first end 82 that is pivotally coupled to the chassis attachment portion 27. Also, the second reaction member 36 may include a second end 84 that is pivotally coupled to the second gear assembly 30 as will be discussed in detail below.

The input drive assembly 32 may be configured for delivering torque from the engine 18 and transmission system 58 of the vehicle 10 to the wheel hubs 50, 56. For example, the input drive assembly 32 of the walking beam assembly 22 may be attached to a differential 62 of the transmission system 58. Accordingly, the engine 18 may generate torque to rotate a shaft 60, and the differential 62 transfers that torque to the respective input drive assemblies 32 of the walking beam assemblies 22, 22'. The input drive assembly 32, in turn, distributes the torque to the first and second gear assemblies 28, 30 and, ultimately, to the first and second wheel hubs 50, 56.

Generally, the input drive assembly 32 may include at least one movable part 61 and an input drive housing 86. As will be discussed, the movable parts 61 may be operatively connected to the transmission system 58 for delivering torque from the engine 18. The input drive housing 86 may enclose (i.e., house) the movable parts 61. Also the input drive housing 86 may protect the movable parts and/or contain lubricant for lubricating the movable parts 61.

In some embodiments, the input drive assembly 32 may include a half shaft 64. The input drive assembly 32 may also include a first central wheel 66 and a second central wheel 68, which are both mounted on the half shaft 64 for rotation therewith. Additionally, the input drive assembly 32 may include a first end wheel 70, which is mounted on a first end shaft 71, and a second end wheel 72, which is mounted on a second end shaft 73. The first end wheel 70 may be spaced apart (i.e., disposed closer to the front of the vehicle 10) from the first central wheel 66. Also, the second end wheel 72 may be spaced apart (i.e., disposed closer to the rear of the vehicle 10) from the second central wheel 68. The first end wheel 70 may be operatively connected to the first central wheel 66 via a first linkage 74. The second end wheel 72 may be operatively connected to the second central wheel 68 via a second linkage 76. In some embodiments, the central wheels 66, 68 and end wheels 70, 72 may be sprockets, and the linkages 74, 76 may be chains that engage the respective wheels 66, 68, 70, 72. In other embodiments, the wheels 66, 68, 70, 72 may have substantially smooth outer diameter surfaces, and the linkages 74, 76 may be belts that frictionally engage the outer diameter surfaces of the wheels 66, 68, 70, 72.

The input drive assembly 32 may additionally include an input drive housing 86. The housing 86 may enclose and house the central wheels 67, 68, the end wheels 70, 72, and the linkages 74, 76 to cover over and protect those components from dirt, debris, and other undesirable objects. As will be discussed below, the housing 86 may also contain a lubricant for the wheels 67, 68, 70, 72, and linkages 74, 76. In some embodiments, the input drive housing 86 may be made out of relatively lightweight material, such as carbon composite material. The input drive housing 86 may include a first end opening 97 that allows passage of the first end shaft 71 out of the housing 86 and a second end opening 90 that allows passage of the second end shaft 73 out of the housing 86. Moreover, the input drive housing 86 may include a first central opening 104 and a second central opening 106 that allow passage of the half shaft 64 out from both sides of the housing 86.

The housing 86 and at least some of the components therein may be attached to the gear assemblies 28, 30 to rotate with the gear assemblies 28, 30 as a unit about the axis 44 relative to the chassis 14. More specifically, in some embodiments, the input drive housing 86 may be fixed to the first gear housing 48 of the first gear assembly 28. Likewise, the input drive housing 86 may be fixed to the second gear housing 54 of the second gear assembly 30. In some embodiments, the input drive housing 86 may be removably attached to the first and/or second gear housings 48, 54, for example, using fasteners.

Additionally, the input drive housing 86 may be supported by the mount member 26 in some embodiments. For example, the input drive housing 86 may be moveably supported by the chassis attachment portion 27 of the mount member 26, for example, by a rotational bearing (e.g., a journal bearing or roller element bearing). Also, in some embodiments, the chassis attachment portion 27 may include openings 89a, 89b from which the housing 86 extends away from the attachment portion 27.

As shown in FIG. 2, one end of the half shaft 64 may extend out of the opening 104 to be rotationally coupled to the differential 62. The opposite end of the half shaft 64 may extend out of the opening 106 to be supported by a bearing 108, which is attached to the end member 83 of the mount member 26. Seals (not particularly shown) may also be included where the half shaft 64 extends out of the opening 104 and/or where the half shaft 64 extends out of the opening 106. Additionally, the first end shaft 71 may extend out of the opening 97 and into the first gear housing 48 via the opening 103. Likewise, the second end shaft 73 may extend out of the opening 90 and into the second gear housing 54 via the opening 105. Accordingly, the first end shaft 72 may be operatively connected to the first gear train 46, and the second end shaft 73 may be operatively connected to the second gear train 52.

In some embodiments, an interior 93 of the housing 86 may be in fluid communication with an interior 94 of the first gear housing 48 and/or an interior 95 of the second gear housing 54. For example, the input drive housing 86 may be fluidly connected to the first gear housing 48 via communication between the first end opening 97 in the housing 86 and the opening 103 in the first gear housing 48. Likewise, the input drive housing 86 may be fluidly connected to the second gear housing 54 via communication between the second end opening 90 in the housing 86 and the opening 105 in the second gear housing 54. Seals (not particularly shown) may also be located at these areas to substantially seal these junctions.

Accordingly, a lubricant 88 may be contained within and may flow between interior 93 of the housing 86, the interior 94 of the first gear housing 48, and the interior 95 of the second gear housing 54. As such, the same lubricant 88 may commonly lubricate the input drive assembly 32 as well as the first and second gear trains 46, 52.

During operation, torque delivered from the engine 18 may transfer through the main output shaft 60, through the differential 62, and through the half shaft 64 to rotate the first and second central wheels 66, 68 in tandem. This causes rotation of the first end wheel 70 and the first end shaft 71, which rotates the first gear train 46 of the first gear assembly 28. The first gear train 46 may have a predetermined gear ratio for increasing the torque from the first end shaft 71, and the increased torque may be delivered to the first hub 50 and wheel 16b. Likewise, rotation of the second central wheel 68 causes rotation of the second end wheel 72 and the second end shaft 73, which rotates the second gear train 52 of the second gear assembly 30. The second gear assembly 30, in turn, increases the torque from the second end shaft 73, and the increased torque is delivered to the second hub 56 and wheel 16c. Accordingly, a high amount of torque may be delivered to the wheels 16b, 16c of the work vehicle 10 via the input drive assembly 32.

In some scenarios, an increase of power from the engine 18 may tend to rotate the walking beam assembly 22 about the axis 44, lifting the wheel 16b (the leading wheel) from the ground while increasing the downward pressure on the wheel 16c (the following wheel). To counteract this tendency, the reaction members 34, 36 provide an opposing force, transferring torque directly to the chassis 14. Also, a sudden decrease in power from the engine 18 may reverse the direction of rotation of the walking beam assembly 22 about the axis 44; however, these forces may be counteracted by the reaction members 34, 36. Accordingly, rotation of the walking beam assembly 22 relative to the chassis 14 may be limited, and torque delivered to the wheels 16b, 16c may be substantially equal.

The modularity of the walking beam assembly 22 may provide several advantages. For example, the walking beam assembly may be more compact and/or lightweight than conventional walking beam assemblies. Certain components may be especially lightweight and compact. For example, the input drive housing 86 may be configured to provide a protective barrier about the input drive assembly 32 and a container for the lubricant 88. However, the housing 86 need not support a substantial amount of structural loads of the walking beam assembly 22 (e.g., bending loads that cause rotation of the walking beam assembly 22, etc.). Instead, the support beam 24 and mount member 26 may be configured to support the majority of structural loads of the walking beam assembly 22. As such, the support beam 24 may have greater strength and stiffness, especially in bending, as compared to the input drive housing 86, whereas the input drive housing 86 may have a substantially lower weight than the support beam 24. Thus, the walking beam assembly 22 may be compact and relatively lightweight as compared to conventional walking beam assemblies.

Also, the modular walking beam assembly 22 may provide manufacturing efficiencies. For example, the different modules may be manufactured independently while other modules are being simultaneously manufactured, and then the modules may be subsequently assembled together. Accordingly, the assembly 22 and the different modules that make up the assembly 22 may be manufactured with a high level of throughput.

The different modules (e.g., support beam 24, mount member 26, first gear assembly 28, second gear assembly 30, first reaction member 34, and second reaction member 36) may be attached together to define the walking beam assembly 22. These modules may be removably attached in some embodiments. For example, the modules may be attached via fasteners. In additional embodiments, at least two modules of the assembly may be welded together. Accordingly, the modules may be detached from each other and replaced with replacement modules. Thus, repair of the walking beam assembly 22 may be facilitated.

Additionally, the modular walking beam assembly of the present disclosure may have a variety of alternative configurations. The modules may be arranged in differently in each of the different configurations. Also, in some embodiments, certain components may be interchanged to change the configuration of the walking beam assembly 22. The configuration of the walking beam assembly 22 may be chosen according to the terrain on which the work vehicle 10 is used, according to the work to be performed, or according to another factor.

Figure 4A:
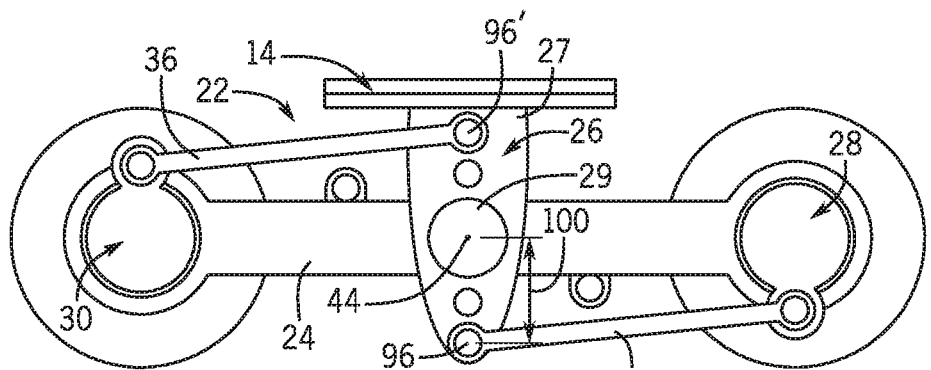
FIG. 4A is a schematic side view of the modular walking beam assembly shown in a first configuration according to example embodiments of the present disclosure.
Figure 4B:
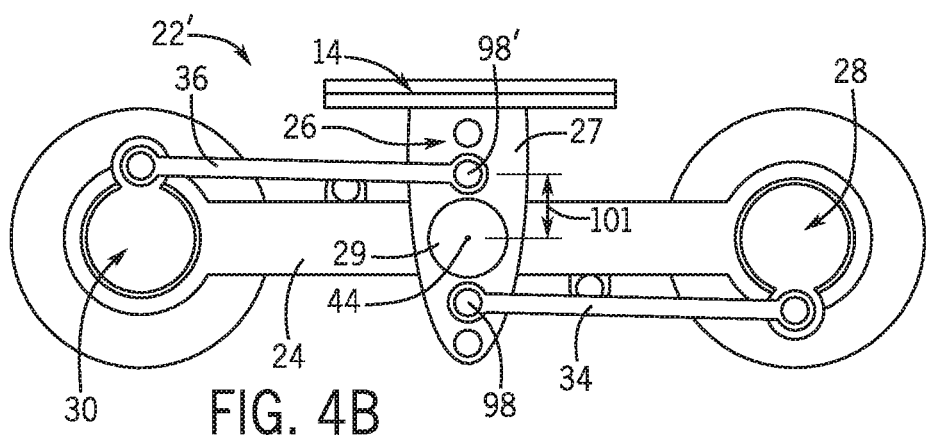
FIG. 4B is a schematic side view of the modular walking beam assembly shown in a second configuration according to example embodiments of the present disclosure.
Figure 4C:
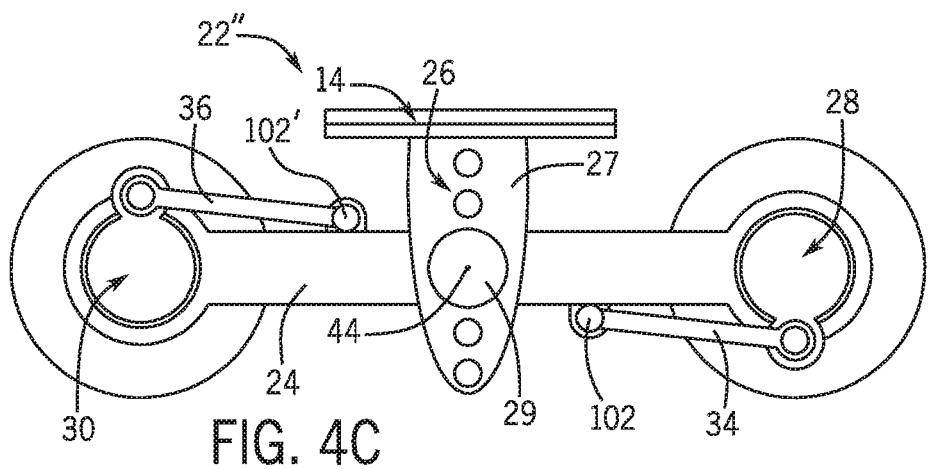
FIG. 4C is a schematic side view of the modular walking beam assembly shown in a third configuration according to example embodiments of the present disclosure.

For example, as shown in FIGS. 4A, 4B, and 4C, different configurations are shown. The walking beam assembly 22 of FIG. 4A is shown in a first configuration, the walking beam assembly 22' of FIG. 4B is shown in a second configuration, and the walking beam 22" of FIG. 4C is shown in a third configuration. In the illustrated embodiments, the walking beam assemblies 22, 22', 22" are substantially similar to each other, except the reaction members 34, 36 may be attached differently in each configuration.

For example, in the walking beam assembly 22 of FIG. 4A, the first reaction member 34 may be attached to the first gear assembly 28 and to a first attachment area 96 of the chassis attachment portion 27 of the mount member 26. Likewise, the second reaction member 36 may be attached to the second gear assembly 30 and to a first attachment area 96' of the chassis attachment portion 27. The first attachment area 96' may be spaced approximately one hundred eighty degrees (180°) from the first attachment area 96, relative to the axis of rotation 44, and both may be spaced apart from the axis 44 at a first radial distance 100.

In comparison, in the walking beam assembly 22' of FIG. 4B, the first reaction member 34 may be attached to the first gear assembly 28 and to a second attachment area 98 of the chassis attachment portion 27. Likewise, the second reaction member 36 may be attached to the second gear assembly 30 and to a second attachment area 98' of the chassis attachment portion 27. The second attachment area 98' may be spaced approximately one hundred eighty degrees (180°) from the second attachment area 98, relative to the axis of rotation 44, and both may be spaced apart from the axis 44 at a second radial distance 101.

The second radial distance 101 may be less than the first radial distance 100. It will be appreciated that these distances 100, 101 represent a moment arm affecting the reaction torque that the reaction members 34, 36 transfer to the chassis 14. Thus, the mechanical advantage is different for the reaction member 34, 36. Accordingly, the range of rotation, the speed of rotation, and/or other rotational characteristics of the walking beam assembly 22 of FIG. 4A would be different than the walking beam assembly 22' of FIG. 4B. Thus, the amount of reaction force can be adjusted based on the selected configuration.

Additionally, in the third configuration of the walking beam assembly 22" of FIG. 4C, the first reaction member 34 may be attached to the first gear assembly 28 and to a third attachment area 102 located on the support beam 24. Likewise, the second reaction member 36 may be attached to the second gear assembly 30 and to a third attachment area 102' located on the support beam 24. As such, reaction forces from the reaction members 34, 36 would transfer back into the support beam 24 instead of the chassis 14. Thus, the support beam 24 would allow a high degree of rotation about the axis 44 as compared to the configurations shown in FIGS. 4A and 4B. Also, the reaction members 34, 36 would provide substantially no reaction forces to the forces tending to rotate the assembly 22" relative to the chassis 14.

Referring now to FIGS. 5, 6, 7, and 8, the walking beam assembly 1022 is shown according to additional example embodiments. The walking beam assembly 1022 may include one or more features descried above in relation to the walking beam assemblies 22, 22', 22' of FIGS. 1-4C. Features that correspond to those of FIGS. 1-4C will be identified with corresponding reference numbers increased by 1000.

For example, the walking beam assembly 1022 may include a support beam 1024, a mount member 1026, a first gear assembly 1028, a second gear assembly 1030, an input drive assembly 1032, a first reaction member 1034, and a second reaction member 1036.

Figure 5:
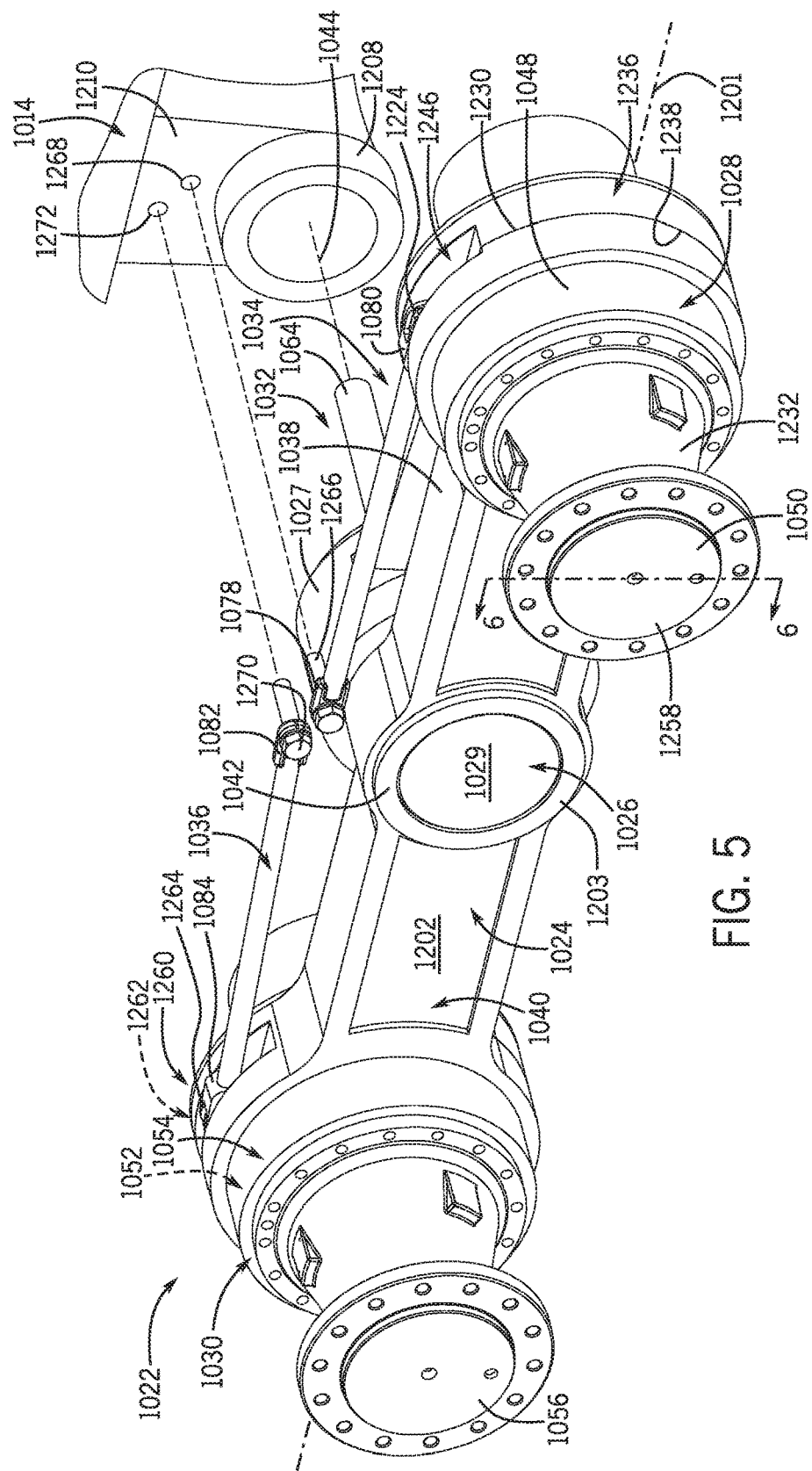
FIG. 5 is a perspective view of the modular walking beam assembly looking inboard according to additional embodiments of the present disclosure.
Figure 7:
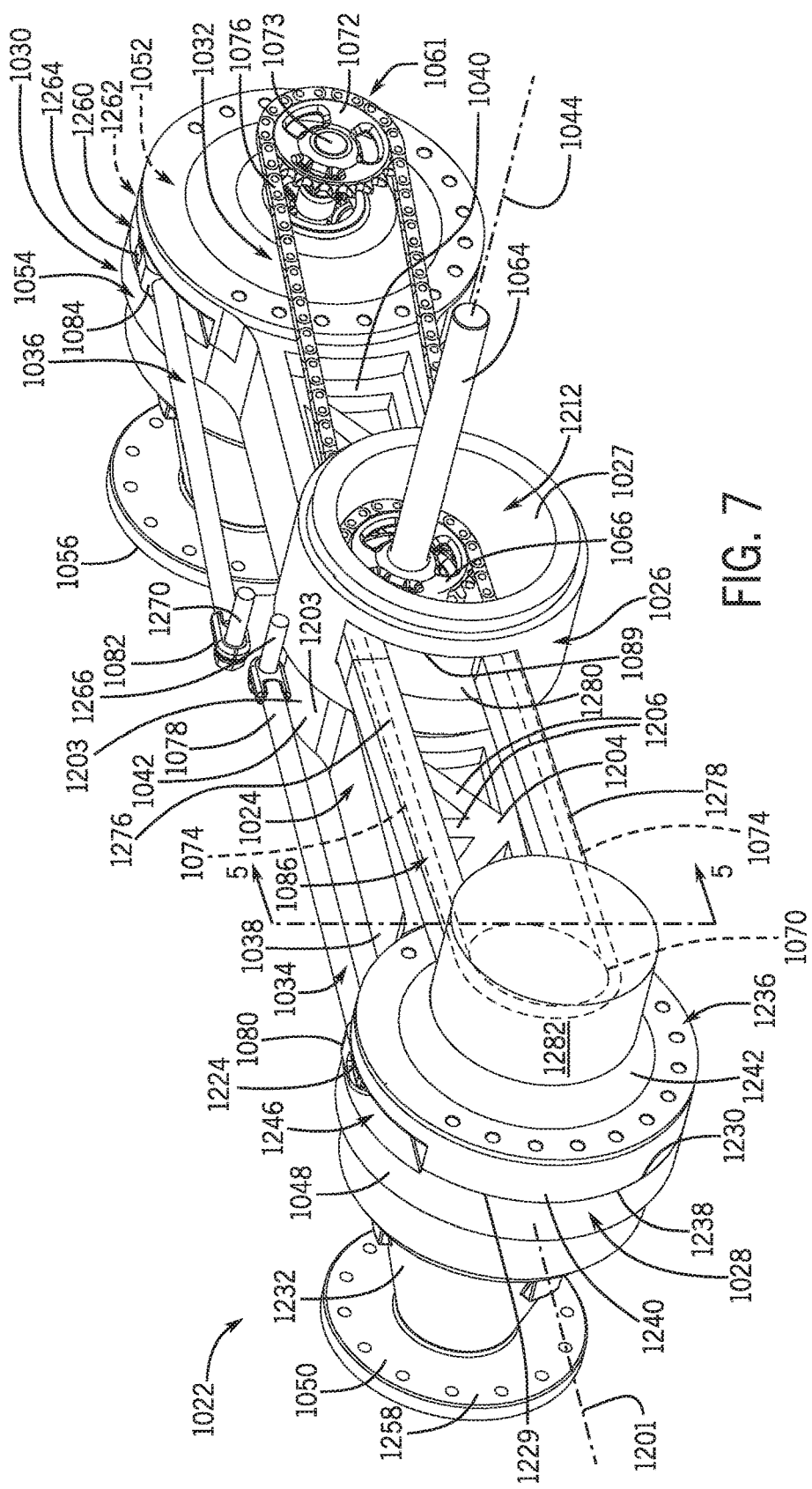
FIG. 7 is a perspective view looking outboard of the modular walking beam assembly of FIG. 5.

In some embodiments, at least some of these components may be configured as different modules as discussed above with relation to FIGS. 1-4C. Specifically, as shown in FIGS. 5 and 7, the input drive assembly 1032 may be configured as a module that may be independently manufactured and then attached to other portions of the assembly 1022. Also, as shown in FIGS. 5 and 7, the support beam 1024, the mount member 1026, the first gear assembly 1028, and the second gear assembly 1030 may collectively define another module that attaches to the input drive assembly 1032.

In some embodiments, at least a portion of the first gear assembly 1028 may be integrally attached to the support beam 1024 to define a unitary, one-piece member. Also, at least a portion of the second gear assembly 1030 may be integrally attached to the support beam 1024 to define a unitary, one-piece member. As shown in FIGS. 5-8, at least a portion of the first gear housing 1048 may be unitary with the support beam 1024, and at least a portion of the second gear housing 1054 may be unitary with the support beam 1024.

The walking beam assembly 1022 will now be discussed in detail according to the embodiment illustrated in FIGS. 5-8. In general, the walking beam assembly 1022 may include an outboard side 1202 that faces outboard from the vehicle, an inboard side 1204 that faces inboard toward a centerline of the vehicle. Additionally, the walking beam assembly 1022 may include an upper side 1205 and a lower side 1207.

The support beam 1024 will be discussed with reference primarily to FIGS. 5 and 7. The support beam 1024 may be an elongate, linear and straight beam with a first end 1038, a second end 1040, and a middle portion 1042. The first and second ends 1038, 1040 may be separated along a longitudinal axis 1201 with the middle portion 1042 disposed between the first and second ends 1038, 1040. The middle portion 1042 may include an annular, ring-shaped portion 1203, which is substantially centered on a transverse axis 1044. The first and second ends 1038, 1040 of the beam 1024 may extend away in opposite directions from the annular portion 1203 along the longitudinal axis 1201. The middle portion 1042 and the first and second ends 1038, 1040 may be integrally attached in some embodiments. The middle portion 1042 may also be hollow whereas the first and second ends 1038, 1040 of the beam 1024 may be substantially solid in cross section. The support beam 1024 may be rigid and strong to resist bending and to support other components of the walking beam assembly 1022. For example, the support beam 1024 may provide a substantial amount of load bearing for the walking beam assembly 1022. In some embodiments, the support beam 1024 may be made of a strong, rigid material, such as steel. Also, in some embodiments, the support beam 1024 may include a plurality of ribs 1206, for example, as shown in FIG. 7. The ribs 1206 may provide additional stiffness without adding significant weight to the walking beam assembly 1022.

As stated, the walking beam assembly may also include a mount member 1026. The mount member 1026 may include a beam attachment portion 1029, which may be rounded. For example, the beam attachment portion 1029 may be cylindrical or disc-shaped. The beam attachment portion 1029 may be at least partly received in the annular portion 1203 of the support beam 1024 as shown in FIG. 5. The beam attachment portion 1029 may be attached to an inner diameter of the annular portion 1203 of the support beam 1024. In some embodiments, the beam attachment portion 1029 may be fixed to the inner diameter of the annular portion 1203. In some embodiments, the beam attachment portion 1029 may be frictionally or interference fit within the annular portion 1203. In other embodiments, the beam attachment portion 1029 may be welded to the annular portion 1203. In further embodiments, the beam attachment portion 1029 may be fixed, but removably attached to the annular portion 1203 via fasteners.

The mount member 1026 may additionally include a chassis attachment portion 1027. The chassis attachment portion 1027 may be hollow and cylindrical in some embodiments represented in FIG. 7. The chassis attachment portion 1027 may be attached to the beam attachment portion 1029 in some embodiments. The chassis attachment portion 1027 may be spaced from the beam attachment portion 1029 in an inboard direction along the transverse axis 1044. As shown in FIG. 7, the chassis attachment portion 1027 may include an opening 1039 that extends through the chassis attachment portion 1027, substantially along the longitudinal axis 1201. Although only one opening 1039 is shown in FIG. 7, it will be appreciated that the opposite side of the chassis attachment portion 1027 may include a similar opening 1039. As will be discussed, the openings 1039 may provide passage of portions of the input drive assembly 1032 through the walls of the chassis attachment portion 1027.

Furthermore, as shown in FIG. 5, the chassis attachment portion 1027 may be attached to the chassis 1014 of the vehicle. In some embodiments, the chassis attachment portion 1027 may be attached to a ring-shaped portion 1208, which is attached to a base mount 1210 of the chassis 1014. In some embodiments, the chassis attachment portion 1027 may be rotationally coupled to the ring-shaped portion 1208 of the chassis 1014. For example, the chassis attachment portion 1027 may journal on the ring-shaped portion 1208 so as to rotate about the transverse axis 1044. In other embodiments, the chassis attachment portion 1027 may be attached to the ring-shaped portion 1208 via another bearing, such as a roller-element bearing (e.g., with ball bearings and/or rollers).

Figure 6:
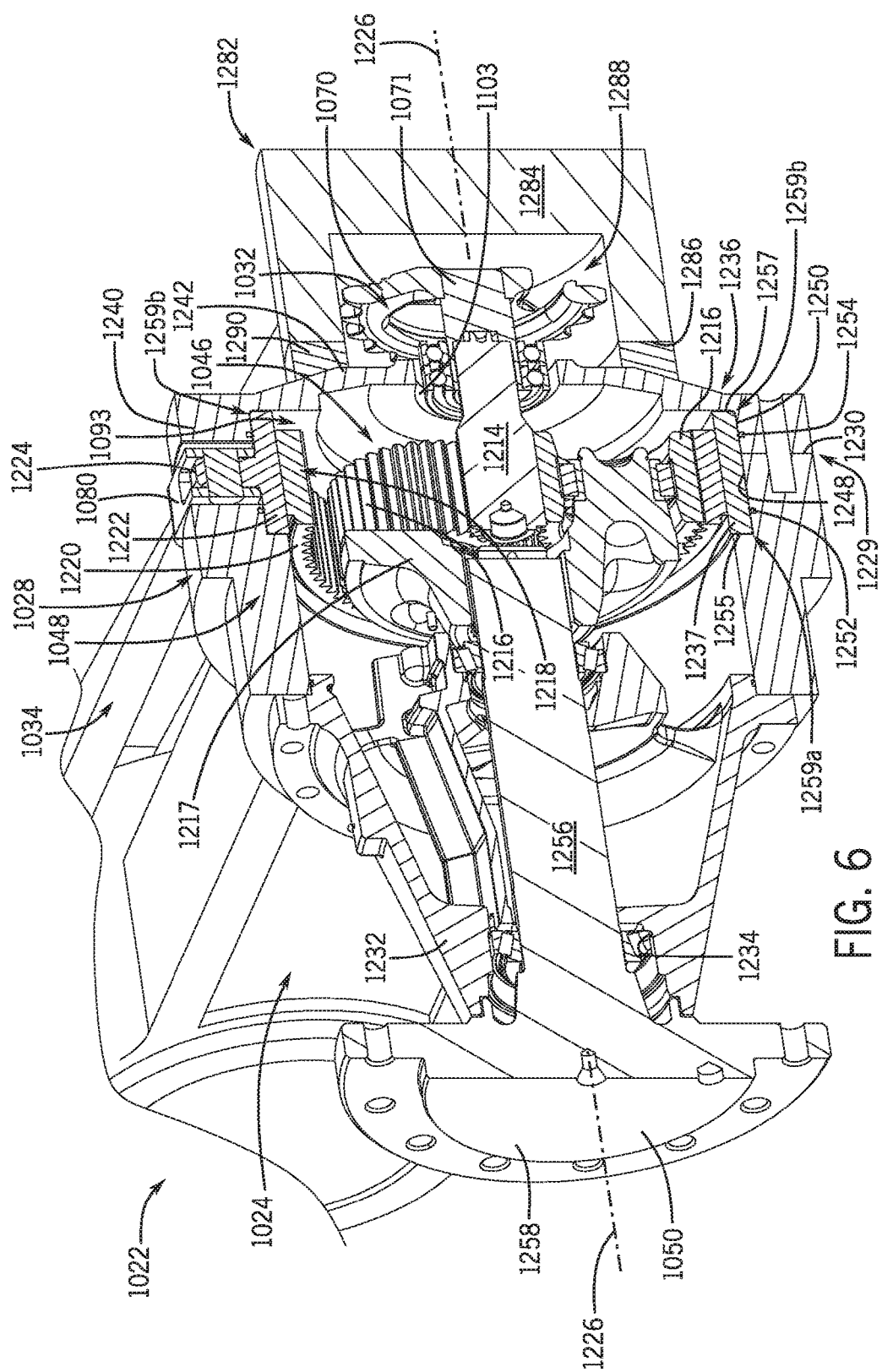
FIG. 6 is a perspective view of the modular walking beam assembly, wherein the assembly is partially sectioned along the line 6-6 of FIG. 5.
Figure 8:
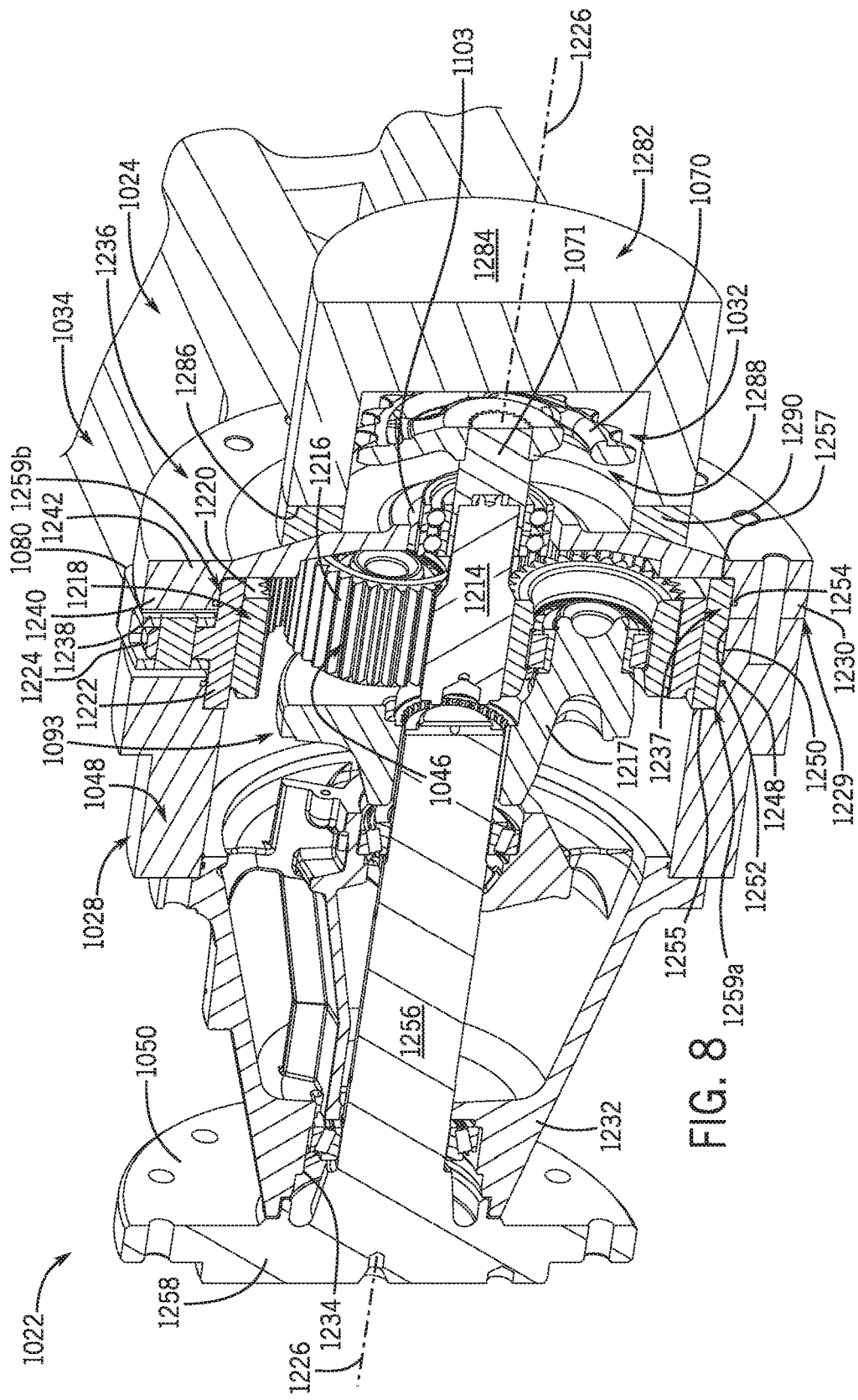
FIG. 8 is a perspective view of the modular walking beam assembly, wherein the assembly is partially sectioned along the line 8-8 of FIG. 7.

As mentioned, the walking beam assembly 1022 may include a first gear assembly 1028. In general, the first gear assembly 1028 may include a first gear train 1046, which is housed substantially within a first gear housing 1048 as shown in FIGS. 6 and 8.

The first gear train 1046 may include a plurality of intermeshed gears. In some embodiments, the first gear train 1046 may be a planetary gear set, which includes a sun gear 1214, a ring gear 1218, and a plurality of planet gears 1216 that are disposed radially between the sun and ring gears 1214, 1218. In some embodiments, the planetary gears 1216 may be interconnected via a carrier 1217, which is partially shown in FIGS. 6 and 8.

The ring gear 1218 may include a gear portion 1220, an outer ring portion 1222, and an attachment portion 1224. The gear portion 1220 may define an inner diameter of the ring gear 1218. Thus, the gear portion 1220 may include a plurality of teeth that mesh with the plurality of planet gears 1216. Also, the outer ring portion 1222 may encircle the gear portion 1220. In some embodiments, the gear portion 1220 may be frictionally attached (e.g., pressed) within the outer ring portion 1222. The attachment portion 1224 may be a projection (e.g., a short lever) that projects radially away (e.g., upward) from the outer ring portion 1222. In some embodiments, the attachment portion 1224 may be integrally attached to the outer ring portion 1222. In additional embodiments, the attachment portion 1224, the outer ring portion 1222 as well as the gear portion 1220 may be integrally attached to define a unitary, one-piece ring gear 1218.

Also, an outer surface (i.e., an outer diameter surface) of the outer ring portion 1222 may define a first journal surface 1250. As will be discussed in detail below, the first journal surface 1250 may journal against an opposing surface of the first gear housing 1048.

The first gear housing 1048 may be substantially hollow and may be configured to house and support the gear train 1046. In some embodiments, the first gear housing 1048 may be a multi-part shell, with different portions of the shell cooperating to define a hollow interior 1093 of the housing 1048. More specifically, the first gear housing 1048 may generally include a first portion 1228 and a second portion 1236, which are attached together to cooperatively define the hollow interior 1093 of the housing 1048. As shown in FIGS. 6 and 8, the first portion 1228 and second portion 1236 may cooperate to define a pocket 1237 that receives the ring portion 1222 of the ring gear 1218. The pocket 1237 may correspond to the ring portion 1222 such that the surfaces of the pocket 1237 conform to the outer diameter surface of the ring portion 1222 and the inboard and outboard end surfaces of the ring portion 1222.

Specifically, in some embodiments, the first portion 1228 may include a ring 1239 and a frusto-conic portion 1232. The ring 1239 may be annular and ring-shaped so as to encircle the outboard end of the ring portion 1222 of the ring gear 1218. The ring 1239 may be substantially centered about an axis 1226. Also, in some embodiments, the ring 1239 may be integrally attached to the first end 1038 of the support beam 1024. Additionally, the first portion 1228 may include an inboard side surface 1230, which faces toward the inboard side 1204 of the walking beam assembly 1022. Furthermore, the frusto-conic portion 1232 may extend outboard from the ring 1239 to define portions of the outboard side 1202 of the walking beam assembly 1022. A hub opening 1234 may extend through the frusto-conic portion 1232. The hub opening 1234 may be substantially centered on the axis 1226.

The second portion 1236 of the first gear housing 1048 may include a ring 1240 and an end cap 1242. The ring 1240 may be annular and portions may be substantially centered about the axis 1226. The ring 1240 may include an outboard side surface 1238, which overlaps and joins to the inboard side surface 1230 of the first portion 1228 of the housing 1048. The end cap 1242 may be flat and disc-shaped so as to close-off the inboard portion of the first gear housing 1048. The end cap 1242 may include a central opening 1103 extending therethrough. The central opening 1103 may be substantially centered on the axis 1226.

As will be discussed in more detail below, the end cap 1242 may substantially close off the first gear housing 1048 and also provide an area of attachment for a separate housing of the input drive assembly 1032. Also, the opening 1103 in the end cap 1242 may be relatively small (e.g., to allow passage of an input shaft to the gear train 1046), but the gear train 1046 may be otherwise encapsulated by the end cap 1242, the ring 1240, and the first portion 1228 of the first gear housing 1048. The end cap 1242 may be disposed between the gear train 1046 of the first gear assembly 1028 and one or more movable parts of the input drive assembly 1032. Accordingly, the end cap 1242 may be referred to as an "intermediate member" between the gear train 1046 and the movable parts of the input drive assembly 1032.

The first gear housing 1048 may also define a first aperture 1246, which exposes a portion of the ring gear 1218. In some embodiments, the aperture 1246 may allow passage of the attachment portion 1224 out of the first gear housing 1048 and/or movement of the attachment portion 1224 relative to the first gear housing 1048. In the illustrated embodiment of FIGS. 5 and 7, the first aperture 1246 is located proximate the upper side 1205 of the walking beam assembly 1022. At this location, the first and second portions 1228, 1236 of the first gear housing 1048 may be spaced apart from each other along the axis 1226. Thus, the first aperture 1246 may be a gap defined between the first and second portions 1228, 1236 of the first gear housing 1048.

Additionally, as shown in FIGS. 6 and 8, the first gear housing 1048 may define a second journal surface 1248 of the first gear assembly 1028. Generally, the second journal surface 1248 may oppose and face the first journal surface 1250 of the ring gear 1218. As shown, the second journal surface 1248 may be partially defined by an inner diameter surface of the first portion 1228 of the first gear housing 1048. Also, the second journal surface 1248 may be partially defined by an inner diameter surface of the second portion 1236 of the first gear housing 1048. As such, the first journal surface 1250 may journal against the second journal surface 1248 such that the ring gear 1218 may rotate about the axis 1226 relative to the first gear housing 1048. It will be appreciated that the opposing journal surfaces 1248, 1250 are able to slide over each other as the ring gear 1218 rotates about the axis 1226 relative to the housing 1048. Thus, the opposing journal surfaces 1248, 1250 may define at least one journal joint 1259a, between the ring gear 1218 and the first gear housing 1048.

The first gear housing 1048 may also include one or more seals 1252, 1254. In the embodiment illustrated, there includes a first seal 1252 and a second seal 1254. The seals 1252, 1254 may be O-ring seals that are received in recesses formed in the first gear housing 1048. The first seal 1252 may be spaced in an inboard direction (along the axis 1226) from an outboard side 1255 of the ring gear 1218. Also, the second seal 1254 may be spaced in an outboard direction (along the axis 1226) from an inboard side 1257 of the ring gear 1218. The seals 1252, 1254 may provide a fluid barrier that maintains lubricant within the journal joints 1259a, 1259b. Accordingly, the journal joint 1259a may be defined between the outboard side 1255 of the ring gear 1218 and the first seal 1252. Also, the journal joint 1259b may be defined between the inboard side 1257 of the ring gear 1218 and the second seal 1254.

It will be appreciated that the first gear assembly 1028 may be relatively compact and lightweight. For example, the journal joint 1259a, 1259b may provide a rotatable attachment in a relatively compact space. There may be no need for a separate roller element bearing (ball bearings or roller bearings) between the ring gear 1218 and the gear housing 1048. Also, the journal joints 1259a, 1259b allow the gear housing 1048 to closely conform in shape to the gear train 1046.

Furthermore, the gear housing 1048 may provide robust support to the ring gear and other portions of the gear train 1046. More specifically, the pocket 1237 within the gear housing 1048 may closely conform to the ring gear 1218 and support the outer diameter portions of the ring gear 1218 as well as the outboard side 1255 and the inboard side 1257 of the ring gear 1218.

Additionally, the width of the aperture 1246 (measured along the axis 1226) may be relatively small. In some embodiments, the aperture 1246 may be slightly wider than the attachment portion 1224 of the ring gear 1218. As such, the internal sides of the aperture 1246 may be disposed proximate the attachment portion 1224 and, in some cases, may limit movement of the attachment portion 1224 along the transverse axis 1226. Accordingly, articulation of the ring gear 1218 relative to the gear housing 1048 may be supported in the radial and transverse directions relative to the axis 1226.

Furthermore, the configuration of the first gear assembly 1028 may provide manufacturing efficiencies. This is because there may be fewer parts as compared to conventional walking beam structures. Accordingly, the total part cost and the time for assembly may be reduced.

Moreover, lubrication of the first gear assembly 1028 may be facilitated due to its configuration. For example, because of the arrangement of the seals 1252, 1254, the journal joints 1259a, 1259b may be in fluid communication with the interior 1093 of the gear housing 1048. Thus, in some embodiments, lubricant may flow between the journal joints 1259a, 1259b and the first gear train 1046. In other words, the same supply of lubricant that lubricates the first gear train 1046 may lubricate the journal joints 1259*a*, 1259*b*. In some embodiments, one or both journal surfaces 1248, 1250 may include a groove to increase the flow of lubricant to the journal joints 1259*a*, 1259*b*.

Additionally, a first wheel hub 1050 may be attached to the first gear train 1046. For example, the first wheel hub 1050 may include a shaft 1256, which is received within the hub opening 1234 and which is fixed to the carrier 1217 of the first gear train 1046. The shaft 1256 may be rotatably supported by the first gear housing 1048 via bearings (e.g., roller element bearings such as ball or roller bearings). As such, the shaft 1256 may rotate relative to the first gear housing 1048 about the axis 1226. The first wheel hub 1050 may also include an end plate 1258, which is fixed to one end of the shaft 125, and which is disposed outside the first gear housing 1048. The wheel 16*b* (FIG. 1) may be attached to the end plate 1258 of the first wheel hub 1050.

As mentioned above, the walking beam assembly 1022 may additionally include the second gear assembly 1030. The second gear assembly 1030 may be substantially similar to the first gear assembly 1028, except the second gear assembly 1030 may be mounted on the second end 1040 of the support beam 1024. Accordingly, the second gear assembly 1030 may include a second gear train 1052 and a second gear housing 1054.

The second gear train 1052 may include a ring gear 1262, which may be substantially similar to the ring gear 1218 of the first gear assembly 1028 described above. Thus, the ring gear 1262 may include an attachment portion 1264. The attachment portion 1264 may extend out of the second gear assembly 1030 via a second aperture 1260 defined in the second gear housing 1054. The second aperture 1260 may be disposed on the second gear housing 1054 proximate the upper side 1205 of the walking beam assembly 1022. In other embodiments, the second aperture 1260 may be disposed on the second gear housing 1054 proximate the lower side 1207 of the walking beam assembly 1022.

The second wheel hub 1056 may be attached to the second gear train 1052 as discussed above in relation to the first gear train 1046. Also, the second wheel hub 1056 may be mounted for rotation relative to the second gear housing 1054. The wheel 16*c* (FIG. 1) may be attached to the second wheel hub 1056.

As mentioned above, the walking beam assembly 1022 may include the input drive assembly 1032. The input drive assembly 1032 may be configured for delivering torque from the engine 18 (FIG. 1) and transmission system of the vehicle 10 to the wheel hubs 1050, 1056.

In some embodiments, the input drive assembly 1032 may include a half shaft 1064 on which is mounted a first central wheel 1066. The first central wheel 1066 is received within the chassis mounting attachment portion 1027 of the mount member 1026. The outboard end of the half shaft 1064 may also be supported for rotation by the beam attachment portion 1029 (e.g., by a bearing that is mounted to the beam attachment portion 1029). Thus, the half shaft 1064 and first central wheel 1066 may rotate as a unit about the axis 1044.

Additionally, the input drive assembly 1032 may include a first end wheel 1070, which is mounted on a first end shaft 1071 as shown in FIGS. 6 and 8. The first end wheel 1070 may be spaced apart from the first central wheel 1066. The first end wheel 1070 may be operatively connected to the first central wheel 1066 via a first linkage 1074, which is shown in phantom in FIG. 7. In some embodiments, the central wheel 1066 and end wheel 1070 may be sprockets, and the linkage 1074 may be a chain that engages the respective wheels 1066, 1070. In other embodiments, the wheels 1066, 1070 may have substantially smooth outer diameter surfaces, and the linkage 1074 may be a belt that frictionally engages the outer diameter surface of the wheels 1066, 1070.

Although not shown, the input drive assembly 1032 may further include a second central wheel that is mounted on the half shaft 1064, similar to the first central wheel 1066. The second central wheel may be disposed on the shaft 1064, relative to the axis 1044, between the first central wheel 1066 and the beam attachment portion 1029 of the mount member 1026. Moreover, the input drive assembly 1032 may include a second end wheel 1072, a second end shaft 1073, and a second linkage 1076 that operatively connects the second central wheel and the second end wheel 1072.

The input drive assembly 1032 may additionally include an input drive housing 1086. The housing 1086 may enclose and house the majority of the movable parts of the input drive assembly 1032 (e.g., the half shaft 1064, the central wheels 1066, the end wheels 1070, 1072, and the linkages 1074, 1076). Accordingly, the input drive housing 1086 may cover over and protect these components from dirt, debris, and other undesirable objects. The housing 1086 may also contain a lubricant for the movable components of the input drive assembly 1032.

Portions of the input drive housing 1086 have been removed from FIG. 7 for purposes of clarity (i.e., to reveal the second linkage 1076, the second end wheel 1072, and the second end shaft 1073). However, FIG. 7 does show portions of the input drive housing 1086 that are proximate the first end 1038 and the first gear assembly 1028. It will be appreciated that the housing 1086 may include corresponding portions on the opposite side of the axis 1044 that cover over and protect the second linkage 1076, the second end wheel 1072, and the second end shaft 1073.

In some embodiments, the input drive housing 1086 may include a linkage covering 1274. The linkage covering 1274 may enclose and house the majority of the first linkage 1074. The input drive housing 1086 may also include an end covering 1282. The end covering 1282 may enclose and house the first end wheel 1070 and the first end shaft 1071 as well as the portion of the first linkage 1074 that engages the first end wheel 1070. In some embodiments, the input drive housing 1086 may further include a central covering 1280.

The linkage covering 1274 may extend between the central covering 1280 and the end covering 1282. In some embodiments, the linkage covering 1274 may include a first member 1276 and a second member 1278. The first member 1276 may be hollow with a rectangular cross section, and an upper segment of the first linkage 1074 may extend through the hollow first member 1276 in some embodiments. Likewise, the second member 1278 may be hollow with a rectangular cross section, and a lower segment of the first linkage 1074 may extend through the hollow second member 1278.

In some embodiments, the first and second members 1276, 1278 of the linkage covering 1274 may connect to the central covering 1280. The central covering 1280 may be a covering that closes off and seals the opening 1089 in the mount member 1026. The central covering 1280 may be attached, for example, to the chassis attachment portion 1027 so as to close off and seal the opening 1089. The hollow interior of the first and second members 1276, 1278 may be in fluid communication with the inboard opening of the mount member 1026. As such, the mount member 1026 may enclose the central wheels 1066 and the half shaft 1064. The first linkage 1074 may pass from the mount member 1026 and through the central covering 1280 to be received within the first and second members 1276, 1278 of the input drive housing 1086.

The end covering 1282 of the input drive housing 1086 may be rounded and somewhat disc shaped. The end covering 1282 may include a closed inboard side 1284 and an open outboard side 1286. The end covering 1282 may define an internal space 1288, which receives the end wheel 1070 and the first end shaft 1071 as shown in FIGS. 6 and 8. The internal space 1288 may be in fluid communication with the first and second members 1276, 1278 of the linkage covering 1274. Also, the outboard side 1286 of the end covering 1282 may encircle the opening 1103 of the first gear housing 1048. Accordingly, the first end shaft 1071 may be aligned with and received within the opening 1103 of the first gear housing 1048. The first end shaft 1071 may be fixed to the sun gear 1214 of the first gear train 1046 such that the first end shaft 1071 and sun gear 1214 rotate as a unit about the axis 1226.

Also, the outboard side 1286 of the end covering 1282 may be attached to the opposing surface of the end cap 1242. In some embodiments, a seal 1290 may be included therebetween to substantially seal this junction. In some embodiments, the seal 1290 may prevent leakage of lubricant that is flowing between the end covering 1282 and the first gear housing 1048.

The end covering 1282 may be fixed to the end cap 1242 of the first gear housing 1048. In some embodiments, the end covering 1282 may be removably attached to the first gear housing 1048, for example, using fasteners. Also, the central covering 1280 may be removably attached to the mount member 1026, for example, using fasteners. It will be appreciated, however, that the end covering 1282 and/or central covering 1280 may be attached in other ways, for example, welding. Thus, the input drive assembly 1032 (including the housing 1086) may rotate as a unit with the support beam 1024, the first gear assembly 1028 and the second gear assembly 1030.

Thus, the end cap 1242 may be an intermediate member that is disposed between the gear train 1046 of the first gear assembly 1028 and the first end wheel 1070 and the first linkage 1074 of the input drive assembly 1032. As such, the end cap 1242 may cooperate with adjacent structures to enclose the first gear train 1046 on one side and to enclose the end wheel 1070 and first linkage 1074 on the opposite side. The input drive housing 1086 may mate to and attach to the end cap 1242 to enclose the end wheel 1076 and adjacent areas of the first linkage 1074. It will be understood that various other configurations would fall within the scope of the present disclosure. For example, in some embodiments, the end cap 1242 could be a member of the input drive housing 1086 that attaches to the ring 1240 of the first gear housing 1048 to thereby substantially close off the inboard side of the first gear housing 1048. Also, in some embodiments, the end cap 1242 could be a member of the first gear housing 1048 as shown in the illustrations, and the input drive assembly 1086 could include a similar end cap that opposes and attaches to the end cap 1242.

In some embodiments, the intermediate portion (i.e., the linkage covering 1274) of the input drive housing 1086 may be spaced apart and detached from the support beam 1024 and the gear housing 1048. In other words, the first and second members 1276, 1278 of the linkage covering 1274 may be supported on each end by the central covering 1280 and the end covering 1282 but otherwise free of the support beam 1024 and the gear housing 1048.

It will be appreciated that the input drive housing 1086 may be relatively compact and lightweight. However, the input drive housing 1086 may provide protection to the internal components of the input drive assembly 1032. Specifically, the drive housing 1086 may be made of lightweight but strong material (e.g., carbon composite or thin-walled metal) because the support beam 1024 may instead be the primary load-bearing member of the assembly 1022, especially in bending about the axis 1044. Also, the first member 1279 and the second members 1278 may be tailored to enclose respective segments of the first linkage 1074, thereby eliminating excess material on the housing 1086.

Furthermore, the housing 1086 may be fluidly connected to the mount member 1026 and the first gear housing 1048 to thereby allow a lubricant to flow continuously through these members. Accordingly, the same supply of lubricant that lubricates the input drive assembly 1032 may also lubricate the first gear train 1046. In some embodiments, portions of the housing 1086 proximate the second end 1040 of the support beam 1024 may be substantially similar to those illustrated for the first end 1038; therefore, the same supply of lubricant that lubricates the input drive assembly 1032 may also lubricate the first gear train 1046 and the second gear train 1052. As such, filling and replacing the assembly 1022 with lubricant may be facilitated since there may be a single cavity to fill/replace.

As mentioned above, the walking beam assembly 1022 may also include a first reaction member 1034 and a second reaction member 1036. The first reaction member 1034 may be an elongate and rigid member, such as a bar, rod, or pole. The second reaction member 1036 may be substantially similar.

The first reaction member 1034 may include a first end 1078 that includes a pin 1266 that is received in a first hole 1268 of the chassis 1014. The pin 1266 may, thus, pivotally attach the first end 1078 of the reaction member 1034 to the chassis 1014. Also, the first reaction member 1034 may include a second end 1080 that is attached to the attachment portion 1224 of the first gear assembly 1028. In some embodiments, the second end 1080 may be received within the aperture 1246 of the first gear housing 1048 to attach to the attachment portion 1224. Also, in some embodiments, the second end 1080 may be pivotally attached to the attachment portion 1224, for example, by a pin or other fastener.

Likewise, the second reaction member 1036 may include a first end 1082 that is pivotally coupled to the chassis 1014. In some embodiments, the first end 1082 may include a pin 1270 that is received within a second hole 1272 of the chassis 1014 to pivotally attach the first end 1082 to the chassis 1014. Also, the second reaction member 1036 may include a second end 1084 that is pivotally coupled to the attachment portion of the second gear assembly 1030.

During operation and travel of the vehicle 10, torque delivered from the engine 18 (FIG. 1) may transfer through the half shaft 1064 to rotate the central wheels 1066, which causes rotation of the first end wheel 1070 and the second end wheel 1072. This, in turn, rotates the first end shaft 1071 and the second end shaft 1073 for rotating the sun gears 1214 of the first and second gear trains 1046, 1052. The first and second gear trains 1046, 1052 may each have a predetermined gear ratio for increasing the torque delivered to the first and second hubs 1050, 1056. Accordingly, a high amount of torque may be delivered to the wheels 16b, 16c of the work vehicle 10.

In some scenarios, an increase of power from the engine 18 may tend to rotate the walking beam assembly 1022 about the axis 1044, lifting the wheel 16b (the leading wheel) from the ground while increasing the downward pressure on the wheel 16c (the following wheel). To counteract this tendency, the reaction members 1034, 1036 provide an opposing force, transferring torque directly to the chassis 1014. Also, a sudden decrease in power from the engine 18 may reverse the direction of rotation of the walking beam assembly 1022 about the axis 1044; however, these forces may be counteracted by the reaction members 1034, 1036.

More specifically, power increase from the engine 18 may tend to rotate the walking beam assembly 1022 about the axis 1044, lifting the wheel 16b from the ground while driving the wheel 16c toward the ground. The first reaction member 1034 is placed in tension and the second reaction member 1036 is placed in compression due to the rotation of the walking beam assembly 1022 about the axis 1044. Thus, the first reaction member 1034 pushes against the attachment portion 1224 of the ring gear 1218 to push the ring gear 1218 tangentially in rotation about the axis 1226. This reaction causes the ring gear 1218 to rotate about the axis 1226 relative to the first gear housing 1048 and relative to the planetary gears 1216. The opposite reaction may occur at the second reaction member 1036, which pulls the second ring gear 1262 in rotation about its respective axis relative to the second gear housing 1054 and relative to the planetary gears within the second gear train 1052. As a result, downforce at the wheel 16b increases and downforce at the wheel 16c decreases, thereby maintaining substantially equal downforce between the wheels 16b, 16c.

These reaction forces may occur, for example, when the vehicle 10 is travelling in a forward direction (i.e., when the wheel 16b is leading the wheel 16c). It will be appreciated that the reactions may be opposite to those described above if, for example, the vehicle 10 is travelling in reverse (i.e., when the wheel 16c is leading the wheel 16b).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A torque compensated walking beam assembly for a vehicle that includes an engine, a chassis, and a wheel, the walking beam assembly comprising:
    a support beam that includes an end;
    a mount member that is configured to mount the support beam on the chassis such that the support beam is able to rotate relative to the chassis;
    a gear assembly that is supported proximate the end of the support beam, the gear assembly including a gear train and a gear housing, the gear train operably coupled to a wheel hub, the wheel hub configured to support the wheel, the gear housing substantially enclosing the gear train; and
    an input drive assembly with at least one movable part configured to deliver an input torque from the engine to the gear train, the input drive assembly including an input drive housing that substantially encloses the at least one movable part, the input drive housing being attached to the gear housing;
    wherein one of the gear housing and the input drive housing includes an intermediate member that substantially closes off the one of the gear housing and the input drive housing;
    wherein the other of the gear housing and the input drive housing is attached to the intermediate member; and
    wherein the intermediate member includes an opening that provides fluid communication between an interior of the input drive housing and an interior of the gear housing.

2. The torque compensated walking beam assembly of claim 1, further comprising a lubricant that is configured to flow between the interior of the input drive housing and the interior of the gear housing.

3. The torque compensated walking beam assembly of claim 1, wherein the input drive assembly includes an end shaft that extends out of the input drive housing through the opening in the intermediate member to extend into the gear housing.

4. The torque compensated walking beam assembly of claim 1, wherein the at least one movable part of the input drive assembly includes a wheel and a linkage that engages the wheel such that a first segment of the linkage extends from the wheel and a second segment of the linkage extends from the wheel, the first segment and the second segment being spaced apart from each other; and
    wherein the input drive housing includes a first linkage covering that encloses the first segment of the linkage, a second linkage covering that encloses the second segment of the linkage, and an end covering that encloses the wheel.

5. The torque compensated walking beam assembly of claim 1, further comprising a reaction member, the walking beam having a first configuration and a second configuration;
    wherein, in the first configuration, the reaction member is connected to the gear assembly and a first attachment area of the chassis;
    wherein, in the second configuration, the reaction member is connected to the gear assembly and a second attachment area of the chassis;
    wherein the first connection area is disposed a first distance from an axis of rotation of the support beam relative to the chassis; and
    wherein the second connection area is disposed a second distance from the axis of rotation.

6. The torque compensated walking beam assembly of claim 5, wherein the walking beam has the first configuration, the second configuration and a third configuration;
    wherein, in the third configuration, the reaction member is connected to the gear assembly and the support beam.

7. The torque compensated walking beam assembly of claim 1, further comprising a reaction member that is attached to the gear assembly and that is configured to attach to the chassis;
   wherein the reaction member is disposed outside the input drive housing and the gear housing.

8. The torque compensated walking beam of claim 1, wherein the intermediate member is an end cap of the gear housing.

9. The torque compensated walking beam assembly of claim 1, further comprising a seal member disposed between the intermediate member and the other of the gear housing and the input drive housing.

10. The torque compensated walking beam assembly of claim 1, wherein the input drive housing is attached to the mount member at a first area;
   wherein the input drive housing is attached to the gear housing at a second area;
   wherein an intermediate portion of the input drive housing is defined between the first area and the second area; and
   wherein the intermediate portion of the input drive housing is detached from the gear housing and the support beam.

11. A method of assembling a torque compensated walking beam assembly for a vehicle, the method including:
   providing a support beam with a mount member and a gear assembly that is supported on an end of the support beam, the mount member configured to rotationally attach the support beam on a chassis of the vehicle, the gear train operably coupled to a wheel hub, the gear housing substantially enclosing the gear train;
   providing an input drive assembly that includes at least one movable part and an input drive housing that substantially encloses the at least one movable part;
   attaching an intermediate member of one of the gear housing and the input drive housing to the other of the gear housing and the input drive housing such that the intermediate member is disposed between the gear train and the at least one movable part of the input drive assembly, wherein the intermediate member includes an opening;
   attaching the at least one movable part of the input drive assembly to the gear train such that the input drive assembly is configured to deliver an input torque from an engine of the vehicle to the gear train; and
   attaching the input drive housing of the input drive assembly to the gear housing such that the opening provides fluid communication between an interior of the input drive housing and an interior of the gear housing.

12. The method of claim 11, further comprising introducing an amount of lubricant within the interior of the input drive housing and the interior of the gear housing, the amount of lubricant configured to lubricate both the gear train and the at least one movable part of the input drive assembly.

13. The method of claim 11, wherein the intermediate member is an end cap of the gear housing; and
   wherein attaching the input drive housing to the gear housing includes attaching the input drive housing to the end cap of the gear housing.

14. The method of claim 11, further comprising configuring the walking beam assembly in one of a first configuration and a second configuration;
   wherein configuring the walking beam assembly in the first configuration includes connecting a reaction member to the gear assembly and a first attachment area of the chassis;
   wherein configuring the walking beam assembly in the second configuration includes connecting the reaction member to the gear assembly and a second attachment area of the chassis;
   wherein the first connection area is disposed a first distance from an axis of rotation of the support beam relative to the chassis; and
   wherein the second connection area is disposed a second distance from the axis of rotation.

15. The method of claim 14, further comprising configuring the walking beam assembly in one of the first configuration, the second configuration, and a third configuration;
   wherein configuring the walking beam assembly in the third configuration includes connecting the reaction member to the gear assembly and the support beam.

16. A modular torque compensated walking beam assembly for a work vehicle having an engine, a chassis, and a wheel, the walking beam assembly comprising:
   a first module that includes:
   a support beam that includes an end;
   a mount member that is configured to mount the support beam on the chassis such that the support beam is able to rotate relative to the chassis; and
   a gear assembly that is supported proximate the end of the support beam, the gear assembly including a gear train and a gear housing, the gear train operably coupled to a wheel hub, the wheel hub configured to support the wheel, the gear housing substantially enclosing the gear train; and
   a second module that is attached to the first module, the second module including an input drive assembly with at least one movable part configured to deliver an input torque from the engine to the gear train, the input drive assembly including an input drive housing that substantially encloses the at least one movable part, the input drive housing being attached to the gear housing;
   wherein one of the gear housing and the input drive housing includes an intermediate member that substantially closes off the one of the gear housing and the input drive housing, and the other of the gear housing and the input drive housing is attached to the intermediate member; and
   wherein the intermediate member includes an opening that provides fluid communication between an interior of the input drive housing and an interior of the gear housing.

17. The modular torque compensated walking beam assembly of claim 16, wherein the intermediate member is an end cap of the gear housing; and
   wherein the input drive housing is removably attached to the end cap of the gear housing.

18. The modular torque compensated walking beam assembly of claim 16, wherein at least a portion of the gear housing is integrally attached to the support beam.

19. The modular torque compensated walking beam assembly of claim 16, further comprising a reaction member that is attached to the gear assembly and that is configured to attach to the chassis;
   wherein the reaction member is disposed outside the input drive housing and the gear housing.

20. The modular torque compensated walking beam assembly of claim 16, further comprising a lubricant that is configured to flow between the interior of the input drive housing and the interior of the gear housing.

* * * * *